US005601863A

United States Patent [19]
Borden et al.

[11] Patent Number: 5,601,863
[45] Date of Patent: Feb. 11, 1997

[54] REDUCED POLYDEXTROSE

[75] Inventors: G. Wayne Borden; Raymond C. Glowaky; Russell J. Hausman; Constantine Sklavounos; Harry O. Tobiassen, all of Groton, Conn.

[73] Assignee: Cultor Food Science, Cultor, Ltd, New York, N.Y.

[21] Appl. No.: 313,940

[22] Filed: Sep. 28, 1994

Related U.S. Application Data

[63] Continuation of Ser. No. 107,487, Aug. 17, 1993, abandoned, which is a continuation of Ser. No. 657,911, Feb. 20, 1991, abandoned.

[51] Int. Cl.$^6$ .................. A23L 1/00; C07H 1/00
[52] U.S. Cl. .................. 426/548; 426/658; 536/112
[58] Field of Search .................. 426/548, 658; 536/112

[56] References Cited

U.S. PATENT DOCUMENTS

| | | | |
|---|---|---|---|
| 2,868,847 | 1/1959 | Boyers | 260/635 |
| 3,516,838 | 6/1970 | Du Puis | 99/150 |
| 3,538,019 | 11/1970 | Capik et al. | 252/437 |
| 3,766,165 | 10/1973 | Rennhard | 260/209 R |
| 3,876,794 | 4/1975 | Rennhard | 426/152 |
| 3,935,248 | 1/1976 | Kruse | 260/635 |
| 4,279,931 | 7/1981 | Verwaerde et al. | 426/48 |
| 4,528,206 | 7/1985 | Kastin . | |
| 4,622,233 | 11/1986 | Torres | 426/548 |
| 4,948,596 | 8/1990 | Bunick | 426/3 |
| 4,956,458 | 9/1990 | Luo | 536/112 |

FOREIGN PATENT DOCUMENTS

| | | |
|---|---|---|
| 289461 | 4/1988 | European Pat. Off. . |
| 342156 | 5/1989 | European Pat. Off. . |
| 380248 | 1/1990 | European Pat. Off. . |
| 368451 | 5/1990 | European Pat. Off. . |
| 214986 | 10/1984 | Germany . |
| 1169538 | 11/1969 | United Kingdom . |

OTHER PUBLICATIONS

"Carbohydrate Chemistry", ed. John F. Kennedy (1988), p. 43.

"Carbohydrate Analysis: a practical approach", ed. M. F. Chaplin and J. F. Kennedy (1986), pp. 43–45.

Braverman, J., "Introduction to The Biochemistry of Foods," pp. 302–312, Elsevier Publishing Co., New York (1963).

Brimacombe, J. S., and Weber, J. M., in W. Pigman and D. Horton, ed. Horton, D., Pigman, W., "The Carbohydrate," vol. IA, p. 479, Academic Press, New York (1972).

Kimiyasu, S., "Patent Abstracts of Japan," vol. 15, No. 137, Apr., 1991 & JP3020301, Ajinomoto Co., Inc. (1991).

Torres, A., et al., "Polydextrose . . . and its Applications in Foods," vol. 35, pp. 44–49, Chicago, IL (1981).

*Primary Examiner*—Steven Weinstein
*Assistant Examiner*—Choon Park Koh
*Attorney, Agent, or Firm*—Ronald S. Courtney

[57] ABSTRACT

A polydextrose having improved color, flavor and decreased reactivity toward food ingredients having amine functionality. The polydextrose comprises a water-soluble highly branched polydextrose having been prepared by a process which comprises melting dextrose in the presence of a food-acceptable acid catalyst. The improved polydextrose of this invention has substantially no reducing glucose groups. Another aspect of this invention is directed to a method of making the above-described improved polydextrose which comprises exposing unimproved polydextrose to an environment capable of chemically transforming the reducing glucose groups contained in the unimproved polydextrose, thereby substantially eliminating their reducing properties. An improved polymaltose prepared by heating maltose in the presence of a food-acceptable acid catalyst and chemically transforming the reducing glucose groups contained in the polymaltose, thereby eliminating their reducing properties, is also described.

28 Claims, No Drawings

5,601,863

REDUCED POLYDEXTROSE

This application is a continuation of U.S. application Ser. No. 08/107,487 filed on Aug. 17, 1993 which is now abandoned which was a continuation-in-part of PCT/US92/00017 filed on Jan. 3, 1992 which is now abandoned which was a continuation of U.S. application Ser. No. 07/657,911 which was filed on Feb. 20, 1991 which is now abandoned.

The field of art to which this invention pertains is polysaccharides, particularly polydextrose and methods of making the same.

BACKGROUND ART

Acid-catalyzed polymerization of saccharides is a well-known phenomenon, described in numerous journal articles, books, and patents. Commonly assigned U.S. Pat. No. 3,766,165, (the disclosure of which is hereby incorporated by reference), to Rennhard, teaches that polymers useful as low-caloric food ingredients can be prepared by heating dextrose or maltose, optionally with a minor amount of a polyol, in the presence of food-acceptable polycarboxylic acid catalysts. Commonly assigned U.S. Pat. No. 3,876,794, (the disclosure of which is hereby incorporated by reference), also to Rennhard, claims various foods containing such polymers. The polyglucose prepared according to Rennhard from a mixture of about 89 percent dextrose, 10 percent sorbitol, and 1 percent citric acid is an approved food additive known as "Polydextrose".

As noted by Torres in commonly assigned U.S. Pat. No. 4,622,233 (the disclosure of which is hereby incorporated by reference), Rennhard's polydextrose possesses a slight bitter taste which limits the breadth of its use in foods. U.S. Pat. No. 4,622,233 teaches that the bitter taste of Rennhard's polydextrose was due to the presence of anhydroglucose, and that color and anhydroglucose content can be reduced by treatment with a solvent and a food approved bleaching agent.

In addition U.S. Pat. Nos. 4,948,596 and 4,956,458 teach the purification of polydextrose by solvent extraction and reverse osmosis respectively. Finally, published European Patent Application EP0380248 teaches a modified polydextrose having less than 0.3 mol % of bound citric acid and a method of preparation of the modified polydextrose.

Thus, there is a continuing search in this field of art for methods of improving polydextrose.

SUMMARY OF THE INVENTION

This invention is directed to polydextrose having improved color, flavor and decreased reactivity toward food ingredients having amine functionality. The polydextrose comprises a water-soluble highly branched polydextrose having been prepared by a process which comprises heating dextrose in the presence of a food-acceptable acid catalyst. The improved polydextrose of this invention has substantially no reducing glucose groups.

Another aspect of this invention is directed to a method of making the above-described improved polydextrose which comprises exposing unimproved polydextrose to an environment capable of chemically transforming the reducing glucose groups contained in the unimproved polydextrose, thereby substantially eliminating their reducing properties. One method of substantially eliminating their reducing properties comprises exposing the unimproved polydextrose to a reducing agent. Preferably the unimproved polydextrose is exposed to hydrogen gas in the presence of a hydrogenation catalyst or a hydride donor.

Another aspect of this invention is directed to polymaltose having improved color, flavor and decreased reactivity toward food ingredients having amine functionality. The polymaltose comprises a water-soluble highly branched polymaltose having been prepared by a process which comprises heating maltose in the presence of a food-acceptable acid catalyst and exposing the polymaltose to an environment capable of chemically transforming the reducing glucose groups, thereby substantially eliminating their reducing properties.

Yet other aspects of this invention are directed to foodstuffs and dry low calorie sweetener compositions containing the above described polydextrose.

Other features and advantages will be apparent from the specification and claims which describe embodiments of this invention.

DETAILED DESCRIPTION OF THE INVENTION

Dextrose optionally with added polyols is polymerized in the presence of polycarboxylic acids according to methods earlier disclosed by Rennhard in U.S. Pat. Nos. 3,766,165 and 3,876,794. The resulting polydextrose products comprise branched chains of polydextrose, defined as unimproved polydextrose, wherein the linkage 1→6 predominates, and having a number average molecular weight between about 1,500 and 18,000. The Rennhard patents further disclose polymaltose products made by polymerization of maltose.

Polydextrose or polymaltose may be made by anhydrous melt polymerization using edible acids (e.g. mineral acids, carboxylic acids, polycarboxylic acids, citric acid) as catalysts and if desired polyols (e.g. sorbitol) as chain terminating agents. Preferably the polydextrose starting material of this invention is made by melting dextrose containing about 0.5 to 3 mol percent of citric acid and about 5% to about 15% sorbitol at a temperature below its decomposition point, maintaining said molten mixture at a temperature of about 140° C. to about 295° C. and at a reduced pressure in the substantial absence of water until substantial polymerization occurs and simultaneously removing water formed during said polymerization.

Some of the thus-formed polydextrose or polymaltose polymer chains are terminated by reducing glucose groups, while others may be terminated by polyol. In addition, a small percentage of the thus-formed polymer chains may be terminated by carboxylic acid groups. The polymer also contains some residual monomeric saccharide, polyol, and acid. By a reducing glucose group is meant a glucose group in which the anomeric hydroxyl group is unbound; thus it and the carbon atom bearing it are free to react as an aldehyde group in reactions such as reduction of Fehling's solution. This definition includes all reducing glucose groups whether free, part of a dimer or higher oligomer, or part of the polymer. Typically, for polydextrose, the total content of reducing glucose groups present as monomeric glucose and reducing endgroups on oligomers or polymer chains, expressed as glucose, ranges from about 6% to about 15% of the product. When corrected for monomeric glucose, which is typically about 3% of the product, the content of reducing glucose groups present as reducing endgroups alone, expressed as glucose, ranges from about 3% to about 12% of the product. It is believed that about 20% to about 40% of the polymer chains are terminated by reducing glucose groups.

It will be readily apparent to those skilled in the art that dextrose or maltose suitable as raw materials can be obtained from a variety of sources, including, for example, acid or enzyme-catalyzed hydrolysis of naturally-occurring glucose polymers. Thus, for example, dextrose can be obtained by hydrolysis of cellulose, while either dextrose or maltose or a mixture of both can be obtained by hydrolysis of starch. It will be further apparent that unpurified preparations such as starch hydrolyzates, if they contain high levels of dextrose, maltose, or both, will be suitable as raw materials. Such materials are within the scope of the present invention.

It is believed that the presence of reducing glucose groups in polydextrose or polymaltose can result in undesirable properties such as dark color, bitter taste, and undesirable reactivity with amines. Thus, under some conditions, food ingredients having amine functionality may be degraded by the presence of polydextrose. Further, in foods which are heated, Maillard reactions of polydextrose with amine-containing food ingredients can lead to undesirable browning.

These reducing glucose groups may be lowered to a level at which there are substantially no reducing glucose groups by the process of this invention. By substantially no reducing glucose groups is meant less than about 1%, by weight, expressed as glucose. By "percent by weight expressed as glucose" is meant that reducing glucose groups are calculated as if they were free glucose, as a percentage of the total polymer (including oligomers and monomers) weight; thus the molar amount of reducing glucose groups is multiplied by the molecular weight of glucose to yield a total which is divided by the total weight of polymer (including oligomers and monomers). At a level of less than about 1% the undesirable properties described above are greatly diminished. It is preferred that the level be less than about 0.5%, and especially preferred that the level be less than about 0.3%. Alternatively and preferably it is believed that substantially all the reducing glucose groups are reduced (i.e. converted) to sorbitol groups.

The process of this invention comprises exposing the above described polydextrose, containing reducing glucose groups, to an environment capable of reducing the polydextrose to form a polydextrose substantially free of reducing glucose groups. Preferably the polydextrose containing reducing glucose groups is reduced by exposure to hydrogen gas in the presence of a hydrogenation catalyst or by reaction with a hydride donor. Another process comprises exposing the above described polymaltose to an environment capable of reducing the polymaltose, to form a polymaltose substantially free of reducing glucose groups, in the same manner as is herein described for the polydextrose.

Preferably the catalytic process comprises adjusting the pH to the desired range, if necessary, and exposing the polydextrose to hydrogen at elevated temperatures and pressures in the presence of a hydrogenation catalyst. If the hydrogenation is a batch process, the product may then be isolated by filtration to remove the catalyst. The product can be isolated by solvent evaporation if desired.

Any source of hydrogen gas may be used in the hydrogenation of this invention. If desired the reactions may be performed under a mixture of hydrogen with a reaction-inert gas such as nitrogen.

Preferably, the process uses a hydrogenation catalyst, such as a noble metal, noble metal oxide, noble metal salt, nickel, or cobalt, which increases the speed of the reaction. Exemplary noble metals are platinum, palladium, and ruthenium, oxides thereof, salts thereof, and combinations thereof. When a nickel catalyst is used, a promoter such as a magnesium salt, nickel phosphate, molybdenum, or iron may optionally be added. Any of the foregoing catalysts may optionally be supported on a carrier such as carbon, alumina, silica, kieselguhr, barium carbonate, barium sulfate, calcium carbonate, or diatomaceous earth. Any amount of catalyst may be used that is effective in achieving the desired end product described above. However it is preferred that the amount of the catalyst be equal to about 0.5% to about 10% of the polydextrose by weight.

The pH of the polydextrose solution should be such that the catalytic hydrogenation yields the desired above described end product. Preferably the pH is such that the hydrogenation occurs in a reasonable time, and that it does not substantially degrade the polydextrose. It is especially preferred that the pH is about 3 to about 9 because outside this range degradation of polydextrose may occur.

Typically, the reduction is performed at a pressure of about 50 psi to about 3000 psi. Any temperature can be used that achieves the desired rate of hydrogenation and that does not substantially degrade the polydextrose. Preferably the temperature is about 20° C. to about 200° C. because below about 20° C. the rate of reaction can be slow and above about 200° C. the polydextrose may be significantly degraded. Generally, the reaction time varies with the pressure, temperature, reactant concentration, catalyst amount, etc.; however, for typical conditions such as those described herein reaction times of about 30 minutes to about 6 hours are normal.

Any solvent system that results in the desired end product described herein may be used; however, typically, a reaction inert solvent capable of dissolving the polydextrose is used. Exemplary solvents include water, alcohols, ethyl acetate, acetic acid and combinations thereof. As used here and elsewhere herein, the expression "reaction inert solvent" refers to a solvent which does not interact with starting material, reagents, intermediates or desired product in a manner which significantly adversely affects the yield of the desired product.

Typically the hydrogenation is performed at a polydextrose concentration of about 10% to about 75% because below about 10% the process is uneconomical and above about 75% the solution typically becomes too viscous.

If desired, hydrogenation can be carried out as a continuous process.

Raney nickel is especially preferred as a catalyst because it is economical and has been found to bring about the desired reaction in an efficient manner. The following conditions are those preferred for use with Raney nickel catalyst. The preferred amount of catalyst, expressed on a dry basis, is equal to about 0.5% to about 10% of the polydextrose by weight. Preferably, the pressure is in the range of about 1000 psi to about 2500 psi, because below about 1000 psi the rate of reaction can be slow, whereas production equipment suitable for use at pressures above about 2500 psi is generally very expensive. The temperature is preferably in the range of about 100° C. to about 160° C., because below about 100° C. the rate of reaction can be slow and above about 160° C. the polydextrose may be significantly degraded. The polydextrose concentration is preferably in the range of about 30% to about 60% because below about 30% the process is uneconomical and above 60% the solution becomes too viscous. Following hydrogenation, the polydextrose solution is preferably purified to remove dissolved nickel cation to a level less than about 10 ppm. This can be done by conventional treatment with a strong cation exchange resin, optionally followed by further treatment with one or more cation exchange or anion exchange resins. However, treatment with strong cation exchange resin can be accompanied by degradation of the polydextrose polymer.

Alternatively, in a preferred embodiment, the solution of hydrogenated polydextrose may be exposed to a strong anion exchange resin to remove dissolved nickel. It is believed that citric acid, present as an impurity in the product, chelates nickel cation to form a negatively charged complex which is taken up by the anion exchange resin. If desired, the resulting solution may then be further purified by exposure to one or more cation exchange or anion exchange resins. Especially preferred is further purification with a weak cation exchange resin, which efficiently removes residual positively charged impurities without causing significant degradation of the hydrogenated polydextrose product. Although a strong anion exchange resin can be used for this purpose, it is preferable to carefully control the treatment conditions to minimize degradation of the polydextrose polymer. A weakly acidic cation exchange resin is preferred because processing conditions are much less crucial.

Preferably the hydride donor process comprises, adjusting the pH to the desired range if necessary and exposing the polydextrose to a hydride donor. The product can be isolated by solvent evaporation if desired.

Sodium borohydride and potassium borohydride are preferred hydride donors. Sodium borohydride is particularly useful because of its commercial availability as an aqueous solution stabilized with sodium hydroxide. Typically an amount of hydride donor effective to achieve the desired product is used. When sodium borohydride is the hydride donor, preferably an amount of sodium borohydride equal to about 0.5% to about 5% of the polydextrose by weight is used because below about 0.5% the reduction can be slow and above about 5% little advantage is gained. Borates resulting from decomposition of borohydride can be removed from the product, for example, by treatment with methanol as described in the Examples or by passage through an ion exchange resin.

Any solvent that results in the desired end product described herein may be used; however, typically, a reaction-inert solvent capable of dissolving the polydextrose is used. Preferably protic solvents are used. Exemplary protic solvents include water, alcohols, water miscible solvents, and combinations thereof.

The pH of the polydextrose solution should be such that the hydride donor reduction yields the desired above described end product. Preferably the pH is such that the hydride donor is stable and polydextrose is not significantly degraded. It is especially preferred that the pH is about 9 to about 12 as below about pH 9 the hydride donor (e.g. sodium borohydride) can be unstable and above about pH 12 polydextrose degradation can occur.

Typically, the reduction is performed at ambient pressures however other pressures such as about 4 psi to about 1000 psi Ray be used. Any temperature can be used that achieves the desired rate of reaction and does not substantially degrade the polydextrose. Preferably the temperature is about 5° C. to about 80° C. because below about 5° C. the rate of reaction can be slow and above about 80° C. the color of the polydextrose may be adversely affected. Generally, the reaction time varies with the temperature, reactant concentration, etc.; however, for typical conditions such as those described herein reaction times of about 30 minutes to about 12 hours are normal.

Typically the hydride donor reduction is performed at concentrations similar to those used for the catalytic hydrogenation.

If desired, the reduced polydextrose made by the above process (e.g. catalytic hydrogenation, hydride reduction) can be purified to improve flavor and color by passage through one or more ion exchange resins. Suitable ion exchange resins include adsorbent resins, anion exchange resins, cation exchange resins, and mixed bed resins comprising an anion exchange resin and a cation exchange resin. Generally, for ion exchange purification, polydextrose concentration is in the range of about 10 to about 70 percent, temperature is in the range of about 10° C. to about 80° C., flow rate is in the range of about 0.1 to about 10 bed volumes per hour, and pressure is in the range of about 1 to about 10 atmospheres. For some resins, upper limits of temperature and pressure below the above described limits may be needed to avoid chemical or physical decomposition of the resins.

The above process provides high yields (e.g. 95–99% and above) of the above described product depending on a variety of factors.

The improved taste of polydextrose or polymaltose of this invention or of food products prepared from such may be determined by a so-called hedonic test. Judges are given coded samples to rate for acceptance by checking a point on the so-called Hedonic scale shown in Table I.

TABLE I

| Hedonic Scale for Evaluating Foods | |
|---|---|
| Scale | |
| 9 | __ Like Extremely |
| 8 | __ Like Very Much |
| 7 | __ Moderately Like |
| 6 | __ Slightly Like |
| 5 | __ Neither Like Nor Dislike |
| 4 | __ Slightly Dislike |
| 3 | __ Moderately Dislike |
| 2 | __ Very Much Dislike |
| 1 | __ Extremely |

At the same time the judges are given a space to provide optional comments. When more than one judge evaluates a sample, the hedonic score is calculated as the numerical average of the individual scores assigned by the individual judges. In addition, the American Public Health Association (APHA) color of an aqueous solution of the polydextrose of this invention provides evidence of the advantages of this invention, a color of zero on the APHA scale (colorless) being the most desirable.

The reduced polydextrose and polymaltose products of this invention are particularly adapted for use as low caloric food bulking additives. They may be used in a variety of foodstuffs, for example as confections, baked goods, frozen desserts, and salad dressings. In addition, they are particularly useful in combination with sweetening agents as dry low calorie sweetener compositions. Preferred sweetening agents include alitame, aspartame, acesulfame and saccharin. In either the foodstuffs or sweetener compositions any amount of polydextrose or polymaltose may be used that provides the desired food properties such as texture, sweetness, caloric level etc.

EXAMPLE 1

Polydextrose

Dextrose monohydrate, sorbitol and citric acid were continuously and intimately mixed in the following proportions by weight: dextrose monohydrate/sorbitol 89.8:10.2 to 90.3:9.7, with citric acid at a level of 0.9 to 1.0% of the total weight. This blend was continuously fed to a reactor operating at an average temperature of 137° C. and at a pressure in the range of 4.1 to 4.6 psia. The feed rate was adjusted to achieve at least 96% polymerization as determined by analysis of residual glucose by the method described on page 59 of the Second Supplement to the Third Edition of the Food Chemicals Codex (National Academy Press, copyright 1986).

EXAMPLE 2

Hydrogenation of Polydextrose in a One-Liter Autoclave

The polydextrose starting material was brownish-yellow in color. A solution of 80 grams of this polydextrose in 320 grams of water was adjusted to pH 6 with 10-molar sodium hydroxide solution, and 8 grams of water-wet Raney nickel catalyst was added. The mixture was heated to 140°–160° C. and hydrogenated at about 1600 psig for about 45 minutes, then cooled and filtered to remove the catalyst. The resulting light yellow solution was spray dried to an off-white (grayish) solid. A 10% w/w solution of this material gave a negative spot test for reducing sugars with aniline-diphenylamine spray reagent. This test was positive for the polydextrose starting material.

EXAMPLE 3

Hydrogenation of Polydextrose in a One-Liter Autoclave

Example 2 was repeated, except that 16 grams of Raney nickel catalyst was used. The product solution was adjusted from pH 8.2 to pH 6.5 with 1-normal hydrochloric acid solution, then spray dried to an almost-white solid. A 10% w/w solution of this material gave a negative spot test for reducing sugars with aniline-diphenylamine spray reagent.

EXAMPLE 4

Purification of Polydextrose by Treatment with Weak Anion Exchange and Strong Cation Exchange Resins (Starting Material for Examples 5–7)

A 60% w/w solution of polydextrose was passed through a column of Rohm and Haas Amberlite IRA 93 weak anion exchange resin at about 50° C. and a flow rate of about 1.7 bed volumes per hour. The resulting solution was passed through a column of Rohm and Haas Amberlite 200 cation exchange resin (hydrogen ion form) at about 40° C. and a flow rate of about 4.1 bed volumes per hour. Purified polydextrose was recovered by evaporating the water in a thin film evaporator and solidifying the melt. By HPLC, it contained 2.0% sorbitol and 3.4% glucose. APHA color of a 10% solution was in the range 125–166 (light yellow).

EXAMPLE 5

Hydrogenation of Ion Exchange—Treated Polydextrose in a One-Liter Autoclave

The starting material was purified polydextrose from Example 4. To a solution of 240 grams of this polydextrose in 360 grams of water, 19.2 grams of 50% water-wet Raney nickel was added. The resulting mixture, which had a pH of 2.5, was heated to 140°–160° C. and hydrogenated at about 1400 psig for one hour, then cooled and filtered to remove the catalyst. The resulting solution was colorless, had a pH of 6.8, and contained about 5 ppm of nickel. By HPLC analysis, the sorbitol content was 5.2% of polydextrose, and there was no detectable glucose. That the reducing end-groups of the polymer had been hydrogenated to sorbitol endgroups was confirmed by examination of the C13 NMR spectrum, which did not show detectable signals corresponding to C-1 of reducing glucose endgroups. In contrast, the spectrum of the starting material showed the expected signals as broad peaks at 93 and 97 ppm from tetramethylsilane ($\alpha$ and $\beta$ anomers, respectively), superimposed on which were sharper signals corresponding to free glucose.

EXAMPLE 6

Hydrogenation of Ion Exchange—Treated Polydextrose in a One-Liter Autoclave

The procedure of Example 5 was followed, except that the polydextrose solution was adjusted to pH 6.1 with potassium bicarbonate prior to hydrogenation. Hydrogenation pressure was about 1650 psig. After filtration, the solution was colorless, pH 8.1. By HPLC analysis, the sorbitol content was 4.5% of polydextrose and there was no detectable glucose. A portion of the solution was evaporated to a white solid, much lighter in color than the starting material.

EXAMPLE 7

Hydrogenation of Ion Exchange—Treated Polydextrose in a 15-Gallon Autoclave, Followed by Cation Exchange to Remove Nickel and Further Treatment by Anion Exchange The starting material was polydextrose from Example 4. To a solution of 8.00 kilograms of this polydextrose in 12.01 liters of water, 640 grams of 50% water-wet Raney nickel was added. This mixture, which had a pH of 2.8, was heated to 140°–150° C. and hydrogenated for 1.2 hours at a pressure of about 1400 psig, then cooled and filtered to remove catalyst. The resulting solution, greenish in color, contained 100 ppm of nickel and had a pH of about 4.8. By HPLC analysis, the polydextrose dissolved therein contained 5.1% sorbitol and 0.3% glucose. This solution was passed through a column of Rohm and Haas Amberlite IRC 200 cation exchange resin (hydrogen ion form) at ambient temperature (about 25° C.) and a flow rate of about 4 bed volumes per hour. The resulting solution contained less than 1 ppm of nickel. Diluted to 10% solids, the solution had an APHA color in the range 25–50. A portion of the solution was passed through a column of Rohm and Haas Amberlite IRA 93 weak anion exchange resin at ambient temperature. The resulting solution was almost colorless. Glucose content by the glucose oxidase method was 0.1% of polydextrose. Diluted to 10% solids, the solution had an APHA color in the range 0–25. Portions of the solution were evaporated to a white solid and to a colorless 70% solution. Evaluated at 50% concentration by a trained food technologist, the product received a hedonic score of 8.0. Unpurified polydextrose at the same concentration received a score of 4.0, while ion-exchange treated polydextrose similar to that used as starting material received scores of 6.5–7.5 at this concentration.

EXAMPLE 8

Hydrogenation of Polydextrose in a 15-Gallon Autoclave

The starting material was unpurified polydextrose containing 3.2% glucose and 1.8% sorbitol by HPLC. To a solution of 8.00 kilograms of this polydextrose in 12.01 liters of water, 640 grams of 50% water-wet Raney nickel was added. The resulting mixture had a pH of 3.1; glucose content by the glucose oxidase method was 3.0% of polydextrose. The mixture was heated to 140°–150° C., hydrogenated for 1 hour at about 1400 psig, and cooled. Because the glucose content by the glucose oxidase method was still 1.5% of polydextrose, the mixture was reheated and hydrogenation was continued for an additional 1.25 hour at approximately 150° C. and 1400 psig. The mixture was cooled and filtered to remove catalyst. The resulting solution had a pH of 3.9 and contained, as percentages of polydextrose, 1.8% glucose by the glucose oxidase method, and 1.1% glucose and 25.9% sorbitol by HPLC. Evidently, at the hydrogenation temperature, the acidity of unpurified polydextrose had caused partial hydrolysis to glucose, which had then been hydrogenated to sorbitol.

EXAMPLE 9

Hydrogenation of Polydextrose in a 15-Gallon Autoclave Followed by Cation Exchange to Remove Nickel and Further Purification by Ion Exchange The starting material was unpurified polydextrose containing 3.2% glucose and 1.8% sorbitol by HPLC. To a solution of 8.0 kilograms of this polydextrose in 12.0 liters of water, 640 grams of 50% water-wet Raney nickel was added. The mixture was adjusted to pH 6.2 by addition of 111 grams of potassium bicarbonate, heated to 140°–150° C., hydrogenated for 1.5 hours at about 1400 psig, cooled, and filtered to remove catalyst. The pH of the resulting solution was 6.1. By HPLC, the sorbitol content was 5.5% of polydextrose, and there was no detectable glucose. At ambient temperature (approximately 25° C.) this solution was passed through a column of Rohm and Haas Amberlite IRC 200 cation exchange resin (hydrogen ion form) at a flow rate of roughly 3 bed volumes per hour, then through a column of Rohm and Haas Amberlite IRA 900 strong anion exchange resin (hydroxide form) at a flow rate of about 0.9 bed volumes per hour, and finally through another column of IRC 200 cation exchange resin (hydrogen ion form) at a flow rate of roughly 2.5 bed volumes per hour. The resulting solution (roughly 40% solids) was colorless. A portion of this solution was spray dried to a white powder which contained 0.2% reducing sugars (as glucose) by the Somogyi-Nelson method. A second portion was evaporated to a white solid which contained 0.2% reducing sugars. Unpurified polydextrose typically contains about 12% reducing sugars. A third portion was concentrated to a colorless solution containing 70% solids, which was evaluated by the series of tests described below. For comparison, the unpurified polydextrose starting material and polydextrose purified by ion exchange alone were evaluated by the same tests. Test results, summarized in Table II, demonstrate the superior color, color stability, and flavor of the material treated by hydrogenation followed by ion exchange.

Color: Aqueous solutions containing 20% w/w of polydextrose were boiled under reflux. Samples taken initially and after 24 hours were diluted to 10% polydextrose and evaluated for color against APHA standards.

Flavor in solution: Aqueous solutions containing 50% w/w of polydextrose were evaluated organoleptically by a trained food technologist.

Flavor in hard candy: Alitame-sweetened hard candy containing about 98% polydextrose was prepared from the test materials and evaluated organoleptically by a 10-member taste panel.

TABLE II

| | Color Stability and Flavor of Polydextrose | | | |
|---|---|---|---|---|
| | APHA color | | Hedonic score | |
| | | After 24-hr | In 50% | In hard |
| Treatment | Initial | reflux | solution | candy |
| None | 125–150 | 400–450 | 4.0 | 4.8 |
| Ion exchange only | 50–100 | 250–300 | 7.0 | 5.8 |
| Hydrogenation and ion exchange | <5 | 5–50 | 8.0 | 6.1 |

EXAMPLE 10

Treatment of Polydextrose with Mixed Bed Resin

A 55% solution of polydextrose in water was passed at about 35°–37° C. through a column containing a 2:1 v/v mixture of Dowex 22 anion exchange resin (hydroxide form) and Rohm and Haas Amberlite 200 cation exchange resin (hydrogen ion form) at a flow rate of about 0.8 bed volumes per hour. Evaluated by a trained food technologist, the product solution, which contained approximately 40% solids, received a hedonic score of 6.5, while a solution of the unpurified starting material at the same concentration received a score of 4.0. Diluted to 10% solids, the product had a color of 175 APHA units.

EXAMPLE 11

Hydrogenation of Polydextrose in a 15-Gallon Autoclave

The starting material was unpurified polydextrose containing 5.7% reducing sugars (as glucose) by the alkaline ferricyanide method. To a solution of 16.5 kilograms of this polydextrose in 13.5 liters of water, 1.32 kilograms of 50% water-wet Raney nickel was added. The resulting solution was adjusted to pH 6 with potassium carbonate, heated to 140°–160° C., hydrogenated at a pressure of 1400–1500 psig for about one hour, cooled to room temperature, and held overnight under a nitrogen atmosphere. After analysis to verify completion of reaction (no glucose detected by the glucose oxidase method), the mixture was heated to 70°–80° C. and filtered to remove the catalyst.

EXAMPLE 12

Treatment of Hydrogenated Polydextrose with Cation Exchange Resin to Remove Nickel A portion of the hydrogenated polydextrose from Example 11 was passed through a column of Dowex 88MB strong cation exchange resin (hydrogen ion form) at a flow rate of 0.5 bed volumes per hour. The resulting solution, containing about 55% w/w of solids, contained about 0.1 ppm of nickel. Reducing sugars by the alkaline ferricyanide method were 0.08 percent of polydextrose.

EXAMPLE 13

Treatment of Polydextrose with Cation Exchange Resin

A 55% w/w solution of unpurified polydextrose (starting material for Example 11) in water was passed through a column of Dowex 88MB strong cation exchange resin (hydrogen ion form) at a flow rate of 0.5 bed volume per hour. The resulting solution contained about 55% w/w of solids.

EXAMPLE 14

Treatment of Hydrogenated Polydextrose with Mixed Bed Resin

A portion of the hydrogenated polydextrose from Example 11 was passed through a column containing a mixture of two parts of Dowex 22 Type II strong anion exchange resin (hydroxide form) and one part of Dowex 88MB strong cation exchange resin (hydrogen ion form) at a flow rate of 0.5 bed volume per hour. The resulting solution, which had been diluted by water added to elute the columns, was concentrated by evaporation to a colorless 50% w/w solution containing 0.05 ppm of nickel.

EXAMPLE 15

Treatment of Hydrogenated Polydextrose with Weak Anion Exchange Resin Followed by Mixed Bed Resin A portion of the hydrogenated polydextrose from Example 11 was passed through a column of Rohm and Haas Amberlite IRA-93 weakly basic anion exchange resin at a flow rate of 1 bed volume per hour, then through a column containing a mixture of two parts of Dowex 22 Type II strong anion exchange resin (hydroxide form) and one part of Dowex 88MB strong cation exchange resin (hydrogen ion form) at a flow rate of 0.5 bed volume per hour. The resulting solution, which had been diluted by water added to elute the columns, was concentrated by evaporation to a colorless 50% w/w solution containing 0.06 ppm of nickel.

EXAMPLE 16

Treatment of Polydextrose with Weak Anion Exchange Resin Followed by Mixed Bed Resin A solution of unpurified polydextrose (starting material for Example 11) containing 55% w/w of polydextrose was passed through a column of Rohm and Haas Amberlite IRA-93 weakly basic anion exchange resin at a flow rate of 1 bed volume per hour, then through a column containing a mixture of two parts of Dowex 22 Type II strong anion exchange resin (hydroxide form) and one part of Dowex 88MB strong cation exchange resin (hydrogen ion form) at a flow rate of 1 bed volume per hour. Both columns were maintained at a temperature of 35° C. The product was recovered as a solid by evaporating the water in a thin-film evaporator.

EXAMPLE 17

Evaluation of Polydextrose from Examples 10–16

Unpurified polydextrose and treated polydextrose prepared from it according to Examples 10–16 were evaluated for color and flavor by the tests described below. Test results, summarized Table III, demonstrate the superior color and flavor of hydrogenated polydextrose and of polydextrose treated by hydrogenation prior to ion exchange purification.

Color: Solutions were diluted to 10% w/w of polydextrose and evaluated for color against APHA standards.

Flavor in solution: Aqueous solutions containing 40% w/w (Example 10) or 50–55% w/w of polydextrose were evaluated organoleptically by a trained food technologist.

Flavor in hard candy: Alitame-sweetened hard candy containing about 98% of polydextrose was prepared from the test materials and evaluated organoleptically by a 4-member taste panel.

Flavor in cake: Yellow cake containing about 27% of polydextrose was prepared from the test materials and evaluated organoleptically by a 4-member taste panel.

The cakes were also qualitatively evaluated for color. Those made with hydrogenated polydextrose from Examples 14 and 15 were significantly lighter in color than those made with untreated polydextrose or with nonhydrogenated polydextrose from Example 16. They were also lighter in color than cakes made with refined sugar instead of polydextrose, indicating that hydrogenation had decreased the level of compounds participating in color-forming reactions.

TABLE III

Evaluation of Polydextrose from Examples 10–16

| Example number | Treatment | APHA color | Hedonic score In solution | In hard candy | In cake |
|---|---|---|---|---|---|
|  | None | 400–500 | 4.0 | 4.3 | 4.5 |
| 13 | Strong cation exchange | 400–500 | 5.5 |  |  |
| 12 | Hydrogenation, strong cation exchange | <50 | 8.0 |  |  |
| 10 | Mixed Bed | 175 | 6.5 |  |  |
| 14 | Hydrogenation, mixed bed | ≈0 | 7.5 | 7.8 | 7.5 |
| 16 | Weak anion | 200–300 | 6.0 | 7.1 | 6.0 |
| 15 | Hydrogenation, weak anion exchange, mixed bed | ≈0 | 8.0 | 7.4 | 6.6 |

EXAMPLE 18

Treatment of Polydextrose with Sodium Borohydride

The unpurified polydextrose starting material was brownish-yellow in color. A solution of 25 grams of this polydextrose in 250 milliliters of water was adjusted to pH 12.5–13 by addition of 2 drops of 10-molar sodium hydroxide solution. A solution of 2.7 grams of sodium borohydride in 27 milliliters of water was then added. Bubbling (hydrogen evolution) was noted, the temperature of the solution rose from about 23° C. to about 30° C., and the color changed from yellow to almost colorless. After 16 hours, the pH of the solution was adjusted from approximately 9 to 6.5 with concentrated hydrochloric acid. To remove boron as trimethyl borate, about 100 milliliters of methanol was added, the solution was concentrated by rotary evaporation at approximately 40° C., and the procedure was repeated. The resulting solution was freeze dried to 30.2 grams of a white solid.

EXAMPLE 19

Treatment of Polydextrose with Sodium Borohydride

The unpurified polydextrose starting material was brownish-yellow in color. A solution of 100 grams of this polydextrose in about 900 milliliters of water was adjusted to a pH of about 9.5 with ammonium hydroxide solution. A solution of 1.1 grams of sodium borohydride in 0.1-molar sodium hydroxide solution was then added, the mixture was stirred overnight, a second 1.1-gram portion of sodium borohydride in 0.1-molar sodium hydroxide solution was added, and the mixture was again stirred overnight. A test for reducing sugars with aniline-diphenylamine spray reagent was negative. This test was positive for the polydextrose starting material. The pH of the solution was adjusted to about 5.7 by addition of about 5 grams of citric acid, and the resulting solution was spray dried to 76.1 grams of a white powder. Comparison of this material with untreated polydextrose by Sephadex chromatography showed no detectable change in its molecular weight distribution.

EXAMPLE 20

Treatment of Polydextrose with Sodium Borohydride

The polydextrose starting material contained 11.8% reducing sugars (expressed as percent glucose) by the Somogyi-Nelson method (Methods in Carbohydrate Chemistry, v. I, 1962, Academic Press, N.Y., p. 346). Color of a 10% aqueous solution was 115 APHA units. A solution of 600 grams of this polydextrose in 2.5 liters of water was adjusted to pH 12.5 by addition of 10 milliliters of 10molar sodium hydroxide solution. A solution of 6.0 grams of sodium borohydride and 1.2 gram of sodium hydroxide in 23 milliliters of water was then added, and the mixture was stirred overnight at ambient temperature. A test for reducing sugars with aniline-diphenylamine spray reagent was negative. This test was positive for the polydextrose starting material. The solution was adjusted to pH 5.5 by addition of 10.0 grams of citric acid, and spray dried to give 536 grams of reducing polydextrose as a white solid. This material contained 0.4% reducing sugars (as glucose) by the Somogyi-Nelson method. Color of a 10% aqueous solution was 23 APHA units.

This invention makes a significant contribution to the field of polydextrose by providing a sorbitol terminated, non glucose reducing group-containing polydextrose having significantly improved properties. These polydextroses have improved color, improved taste, and a significantly reduced reactivity to food ingredients with amine functionality such as food additives. In addition this invention provides an efficient method of making these polydextroses.

It should be understood that the invention is not limited to the particular embodiments described herein, but that various changes and modifications may be made without departing from the spirit and scope of this novel concept as defined by the following claims.

Example 21

Hydrogenation of Polydextrose in a 15-Gallon Autoclave

A mixture of 612 pounds of unpurified polydextrose and 388 pounds of water was stirred at 45° C. until dissolution was complete, 6.6 pounds of sodium bicarbonate was added, and stirring was continued for 30–60 minutes. The pH of the resulting solution was in the range 6.0 to 6.5. To 80.0 pounds of this solution in a 15-gallon autoclave, 3.9 pounds of 50% water-wet Raney nickel catalyst was added. The mixture was heated to 140° C. and hydrogenated at 1400–1500 psig for 2–3 hours until hydrogen uptake was essentially complete, then purged of hydrogen. Catalyst was removed by filtration.

Example 22

Treatment of Hydrogenated Polydextrose with Strong Anion Exchange Resin Followed by Weak Cation Exchange and Mixed Bed Resins A portion of hydrogenated polydextrose solution from Example 21 was passed through two freshly prepared columns each containing 0.147 cubic feet of Rohm and Haas Amberlite (Rohm and Haas, Philadelphia, Pa.) IRA 900 strong anion exchange resin. IRA 900 is a macroreticular resin containing quaternary ammonium functionality on a styrene-divinylbenzene matrix. The solution was maintained at 42°–48° C. Water initially displaced from the columns was discarded. Over a 13.5 hour period, 70.0 pounds of polydextrose solution was collected. The columns were blown dry to make recovery nearly quantitative. The resulting solution was passed through a column containing 0.147 cubic feet of IRC 50 weak cation exchange resin. IRC 50 (Rohm and Haas, Philadelphia, Pa.) is a macroporous resin containing carboxylic functionality on a methacrylic acid—divinylbenzene matrix. Resins were regenerated using the manufacturer's recommended procedures.

Solutions purified by three repetitions of the above procedure were pooled and passed through a 0.147 cubic foot column containing equal equivalents of IRA 900 and IRC 50 resins. The solution was maintained at 38°–42° C. Water initially displaced from the column was discarded. Over a 9.5 hour period, 210 pounds of polydextrose solution was collected. Residual polydextrose was eluted from the column with about 2 bed volumes of water. Polydextrose was recovered by evaporating water in a thin film evaporator and solidifying the resulting molten polydextrose on a cooling belt.

We claim:

1. In a water-soluble highly branched polydextrose wherein the linkage 1–6 predominates, having number average molecular weight between about 1,500 and 18,000, and having been prepared by a process which comprises melting dextrose in the presence of a food-acceptable polycarboxylic acid catalyst, the improvement comprising said polydextrose having less than about 1% reducing glucose groups by weight expressed as glucose.

2. The polydextrose as recited in claim 1 having less than about 0.5% reducing glucose groups by weight expressed as glucose.

3. The polydextrose as recited in claim 1 having less than about 0.3% reducing glucose groups by weight expressed as glucose.

4. A water-soluble highly branched polydextrose having been prepared by the steps comprising (a) heating a mixture comprising dextrose in the presence of a food-acceptable acid catalyst; and (b) lowering the content of reducing glucose groups to a level where there are less than about 1% reducing glucose groups by weight expressed as glucose.

5. A water-soluble highly branched polymaltose having been prepared by the steps comprising (a) heating a mixture comprising maltose in the presence of a food-acceptable acid catalyst; and (b) lowering the content of reducing glucose groups to a level where there are less than about 1% reducing glucose groups by weight expressed as glucose.

6. A method of making an improved water-soluble polydextrose wherein the linkage 1→6 predominates, having an average molecular weight between about 1,500 and 18,000, which comprises exposing polydextrose to an environment capable of reducing glucose groups of said polydextrose to sorbitol groups, thus reducing said glucose groups to sorbitol groups, said glucose groups being less than about 1% reducing glucose groups by weight expressed as glucose.

7. The method as recited in claim 6, further comprising treatment of said reduced polydextrose with an adsorbent resin, a cation exchange resin, an anion exchange resin, or a mixed bed resin.

8. The method as recited in claim 6 wherein the polydextrose is exposed to hydrogen gas and a hydrogenation catalyst in a reaction-inert solvent.

9. The method as recited in claim 8 wherein said catalyst is selected from the group consisting of noble metals, noble metal oxides, noble metal salts, nickel, and cobalt.

10. The method as recited in claim 8 wherein said catalyst comprises nickel and a promoter chosen from the group consisting of magnesium salts, nickel phosphate, molybdenum, and iron, and combinations thereof.

11. The method as recited in claim 9 wherein said catalyst is supported on a carrier chosen from the group consisting of carbon, alumina, silica, kieselguhr, barium carbonate, barium sulfate, calcium carbonate, and diatomaceous earth.

12. The method as recited in claim 11 wherein said catalyst is Raney nickel.

13. The method as recited in claim 8 wherein the pH is about 3 to about 9.

14. The method as recited in claim 8 wherein the solvent is water.

15. The method as recited in claim 8 wherein the hydrogenation is performed at a pressure in the range of about 50 psi to about 3000 psi.

16. The method as recited in claim 8 wherein the hydrogenation is performed at a temperature in the range of about 20° C. to about 200° C.

17. The method as recited in claim 8 wherein the polydextrose concentration is about 10% to about 75%.

18. The method as recited in claim 8 wherein the catalyst is present in an amount equal to about 0.5% to about 10% of the polydextrose by weight.

19. The method as recited in claim 8 wherein the solvent is water, the pH is about 3 to about 9, the polydextrose concentration is about 10% to about 75%, the catalyst is present in an amount equal to about 1% to about 10% of the polydextrose by weight, the pressure is in the range of about 50 psi to about 3000 psi, and the temperature is in the range of about 20° C. to about 200° C.

20. The method as recited in claim 12 wherein the solvent is water, the pH is about 3 to about 9, the polydextrose concentration is about 30% to about 60%, the Raney nickel is present in an amount equal to about 0.5% to about 10% of the polydextrose by weight, the pressure is in the range of about 1000 psi to about 2500 psi, and the temperature is in the range of about 100° C. to about 160° C.

21. The method as recited in claim 20 further comprising treatment of said reduced polydextrose with an adsorbent resin, a cation exchange resin, an anion exchange resin, or a mixed bed resin.

22. The method as recited in claim 6 wherein the polydextrose is exposed to a hydride donor in a reaction-inert solvent.

23. The method as recited in claim 22 wherein the hydride donor is selected from the group consisting of sodium borohydride and potassium borohydride, and combinations thereof.

24. The method as recited in claim 22 wherein the hydride donor is sodium borohydride, the reaction-inert solvent is water, and the pH is about 9 to about 12.

25. The method as recited in claim 24 wherein the polydextrose concentration is about 30% to about 60%, an amount of sodium borohydride equal to about 0.5% to about 5% of the polydextrose by weight is used, and the temperature is in the range of about 5° C. to about 80° C.

26. A product comprising a foodstuff and a polydextrose of claim 1.

27. A foodstuff of claim 26 further comprising one or more sweetening agents selected from the group consisting of alitame, aspartame, acesulfame, and saccharin.

28. A dry low calorie sweetener composition comprising at least 50% by weight of a polydextrose of claim 1 and one or more sweetening agents selected from the group consisting of alitame, aspartame, acesulfame and saccharin.

* * * * *